(12) United States Patent
Lofgren

(10) Patent No.: US 6,612,049 B2
(45) Date of Patent: Sep. 2, 2003

(54) PREHEATING AND DRYING DEVICE

(76) Inventor: Roland Lofgren, Fredriksdalsplatsen 2, Helsingborg (SE)

( * ) Notice: Subject to any disclaimer, the term of this patent is extended or adjusted under 35 U.S.C. 154(b) by 0 days.

(21) Appl. No.: 10/111,271
(22) PCT Filed: Jan. 5, 2001
(86) PCT No.: PCT/SE01/00014
§ 371 (c)(1), (2), (4) Date: Apr. 19, 2002
(87) PCT Pub. No.: WO01/49471
PCT Pub. Date: Jul. 12, 2001

(65) Prior Publication Data
US 2002/0162244 A1 Nov. 7, 2002

Related U.S. Application Data
(60) Provisional application No. 60/174,452, filed on Jan. 5, 2000.

(51) Int. Cl.[7] .................................................. F26B 17/00
(52) U.S. Cl. .............................. 34/580; 34/576; 34/165; 34/222
(58) Field of Search ........................ 34/576, 580, 588, 34/90, 165, 167, 175, 218, 222, 235

(56) References Cited

U.S. PATENT DOCUMENTS

| | | | | |
|---|---|---|---|---|
| 2,315,084 A | * | 3/1943 | Chesler ........................ 241/39 |
| 4,285,328 A | * | 8/1981 | Fritz et al. ................... 126/225 |
| 4,588,366 A | * | 5/1986 | Glatt ........................... 425/222 |
| 4,859,316 A | * | 8/1989 | Polderman ................... 208/166 |
| 5,052,596 A | * | 10/1991 | Philippi ....................... 222/593 |
| 5,149,398 A | * | 9/1992 | Shaffer et al. .............. 159/4.01 |
| 5,590,479 A | * | 1/1997 | Ruf et al. ...................... 34/587 |
| 6,143,221 A | * | 11/2000 | Gurol .......................... 264/118 |

FOREIGN PATENT DOCUMENTS

| | | | | |
|---|---|---|---|---|
| EP | 312741 A2 | * | 4/1989 | ........... B29B/13/06 |
| GB | 1106194 A | * | 3/1968 | ............. F26B/3/08 |
| WO | WO 00/30822 A1 | * | 6/2000 | ........... B29B/13/06 |
| WO | WO 00/53383 A1 | * | 9/2000 | ............. B29B/9/10 |

* cited by examiner

Primary Examiner—Ira S. Lazarus
Assistant Examiner—Andrea M. Ragonese
(74) Attorney, Agent, or Firm—Rolf Fasth; Fasth Law Offices

(57) ABSTRACT

The preheater and dryer device has a housing and a first collector is disposed inside the housing. A feeding device extends into the housing and contains a material to be dried and preheated. A movable and hollow central conduit extends from the upper end of the housing to a bottom portion of the first collector. The central conduit carries a hot and dry air into the housing. A first and a second conical shield are attached to the central conduit. The central conduit is movable between a first open position and a second closed position. The second conical shield is tightly held against the first collector to close the bottom opening thereof when the central conduit is in the second closed position and the second conical shield is separated from the first collector when the central conduit is in the first open position.

10 Claims, 5 Drawing Sheets

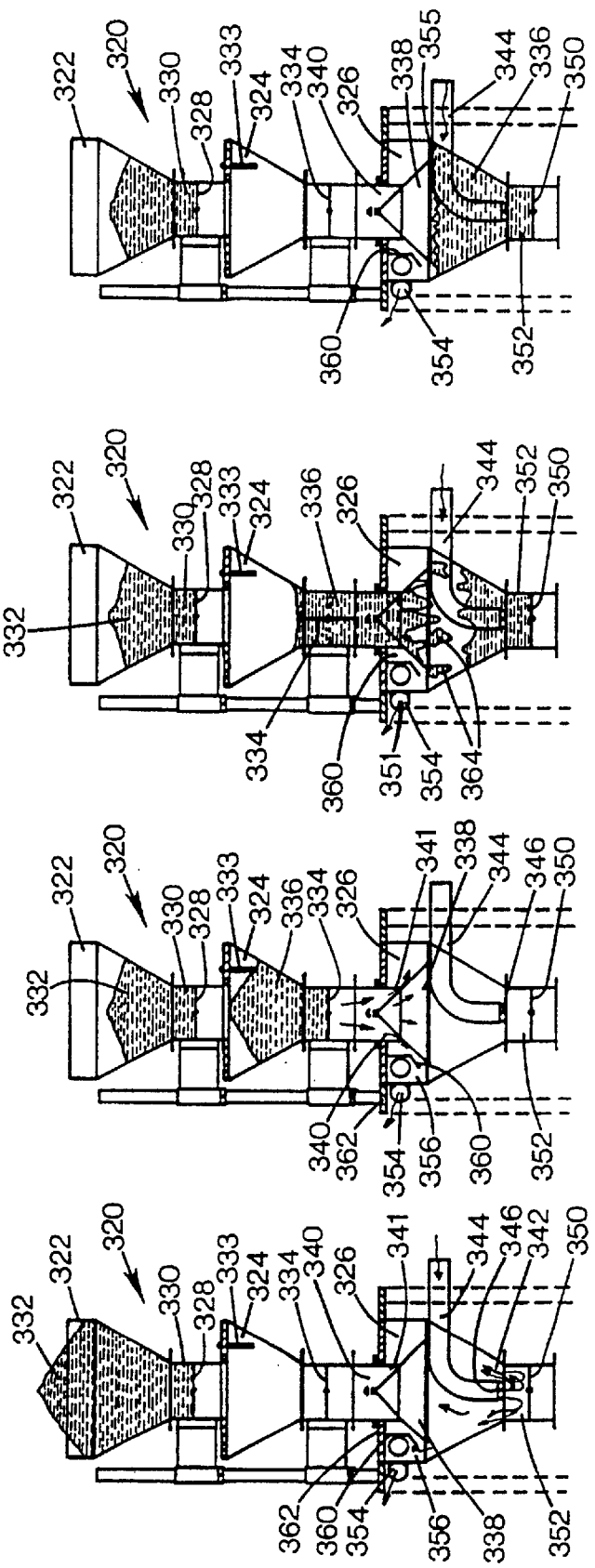

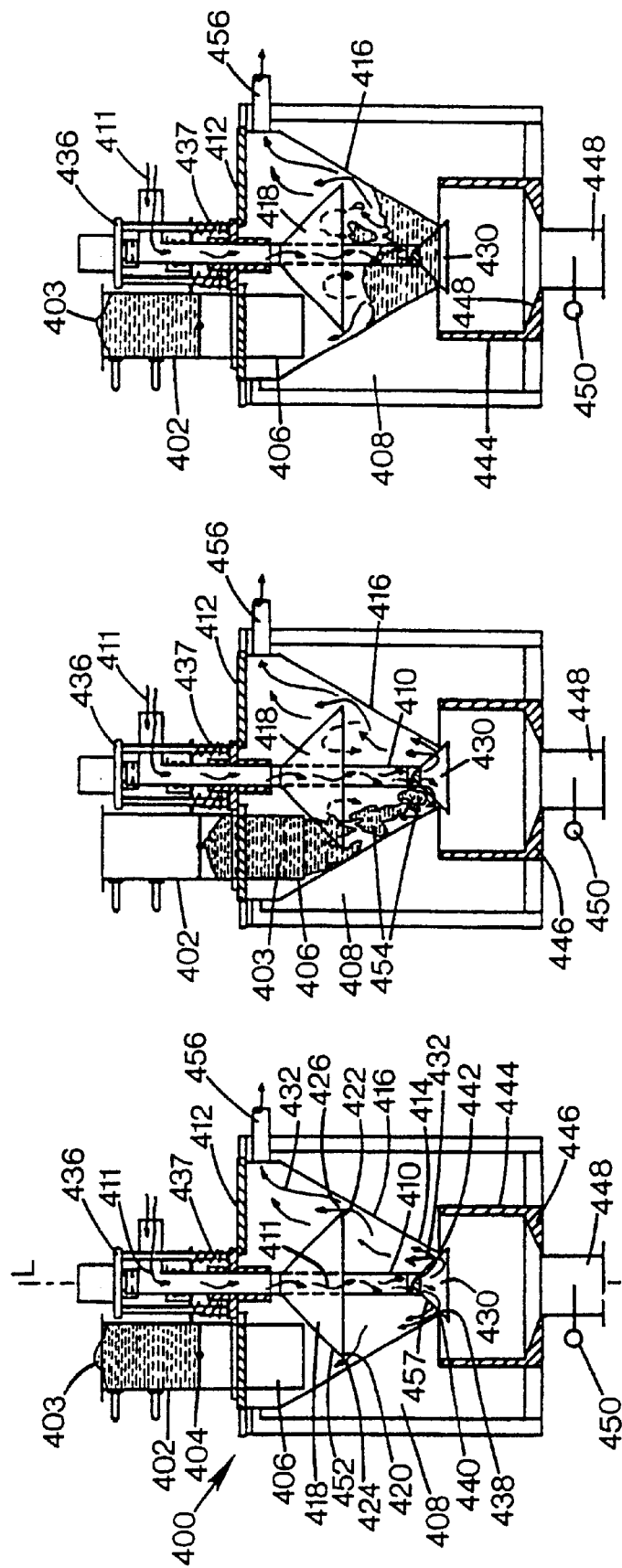

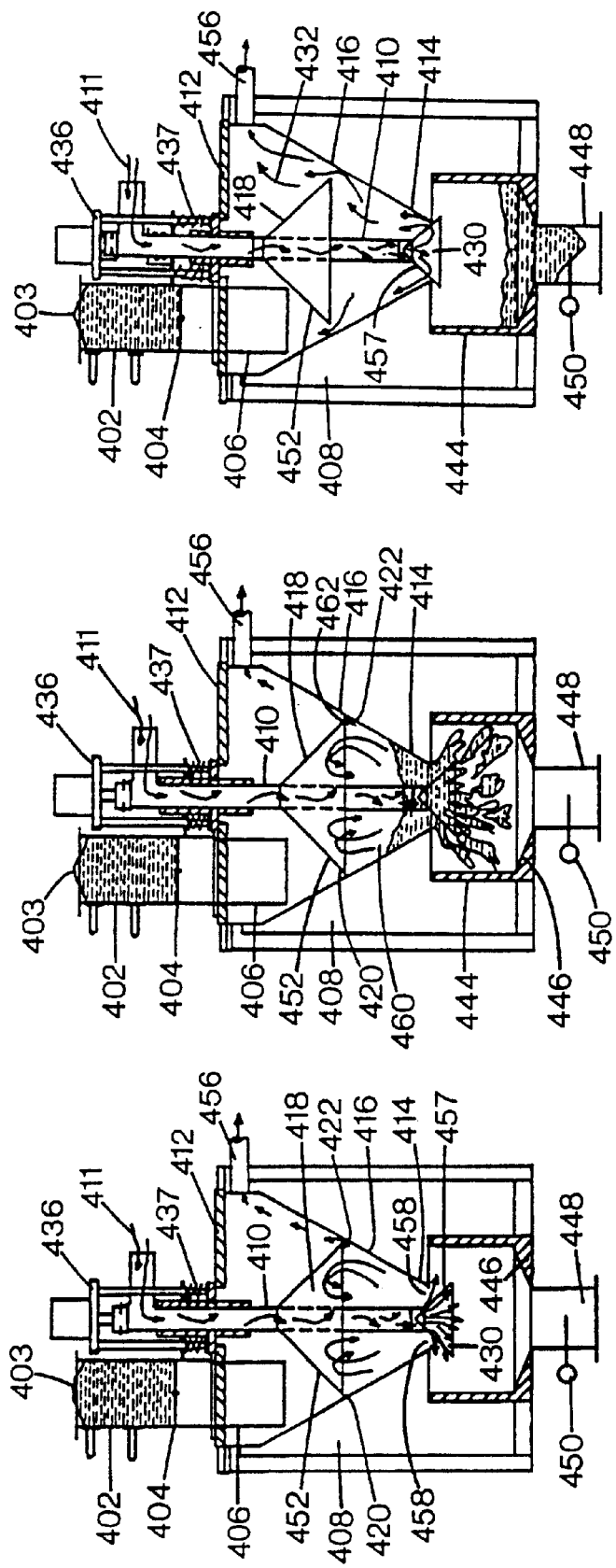

PREHEATING AND DRYING DEVICE

PRIOR APPLICATIONS

This application is a U.S. national phase application based upon International Application No. PCT/SE01/00014, filed Jan. 5, 2001; which claims priority from U.S. Provisional Application No. 60/174,452; filed Jan. 5, 2000.

TECHNICAL FIELD

The present invention relates to a preheating and drying device for polymeric and other materials.

BACKGROUND AND SUMMARY OF THE INVENTION

Before a material, such as a polymeric material, is processed, it is important to remove contaminants and moisture from the material to prevent defects such as warping, uneven shrinkage and undesirable discoloration. Many devices have been developed in the past that remove such contaminants and moisture. However, such conventional devices are often very expensive to manufacture, unreliable and require long production cycles. There is a need for an inexpensive and reliable device for heating and drying a material to remove contaminants and moisture before it is further processed.

The preheating and drying device of the present invention has a housing and a first collector is disposed inside the housing. A feeding device extends into the housing and contains a material to be dried and preheated. A movable and hollow central conduit extends from the upper end of the housing to a bottom portion of the first collector. The central conduit carries a hot and dry air into the housing. A first and a second conical shields are attached to the central conduit. The central conduit is movable between a first open position and a second closed position. The second conical shield is tightly held against the first collector to close the bottom opening thereof when the central conduit is in the second closed position and the second conical shield is separated from the first collector when the central conduit is in the first open position to permit the material to flow through the bottom opening.

BRIEF DESCRIPTION OF THE DRAWINGS

FIGS. 3A–D are cross-sectional side views of a third embodiment of the preheater of the present invention; and FIGS. 4A–F are cross-sectional side views of a fourth embodiment of the present invention.

DETAILED DESCRIPTION

Figure 1A:
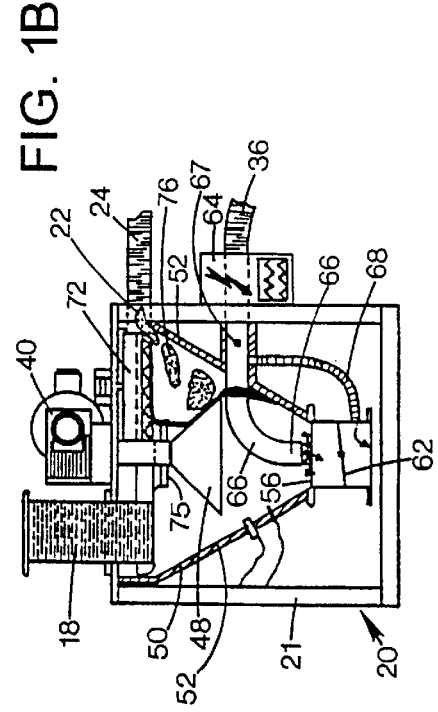
FIGS. 1A–D are cross-sectional side views of the preheater of the present invention.
Figure 1B:
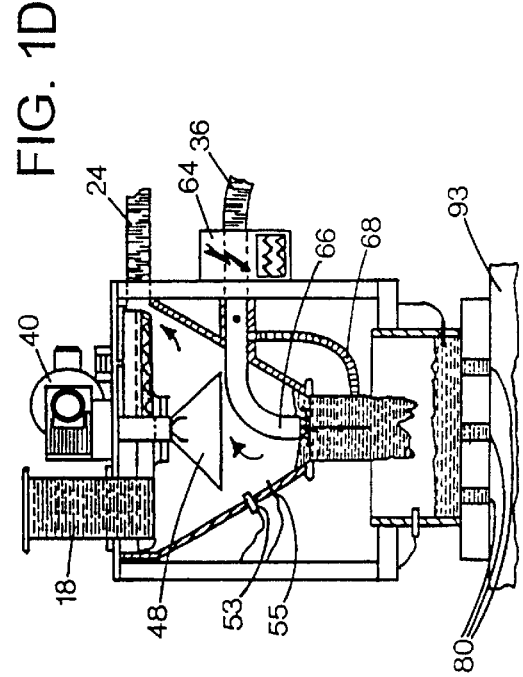

With reference to FIGS. 1A–D, the preheater 20 includes a tight housing 21. The preheater 20 has an electric motor 40 attached to a lid 23 of the housing 21. The motor 40 is in operative engagement with a rotatable drying plate 42 via a drive shaft 44. The motor 40 operates at a certain frequency pulse. By counting the pulses, it may be possible to determine the amount of material 70 that has been deposited on the plate 42. The plate 42 may have raised vertical side walls 43 that prevents the material 70 from being sucked out through the outlet hose 24. The motor 40 rotates the drying plate 42 at a very constant and predetermined rotational speed. The chute 18 has a bottom end 46 that is precisely positioned above the plate 42. For example, the bottom end 46 may be about 1 millimeter above the surface of the plate 42. Of course, the bottom end 46 may be closer or further away from the plate 42 such as 2–5 millimeters, depending upon the feeding material used. In the preferred embodiment, the material could an amino material such as a melamine, phenol or urea based material. Other feed material may also be used.

At a bottom end of the drive shaft 44 is a dust cone 48 attached. The dust cone 48 is disposed inside a V-shaped container 50 with slanting side walls 52, 54. The side walls 52, 54 are preferably insulated to reduce any heat loss through conduction. The side wall 52 has a maximum level sensor 53 and a temperature sensor 55 located below the sensor 53. The container 50 has a bottom end 56 that has a raised air distributor 58 located in the center of the bottom wall. The opening 58 leads into a cylindrical vertical channel 60 that has an openable valve 62 disposed therein.

The air hose 36 is connected to a heating unit 64 located at the inlet 38 to heat the air flowing in the air hose 36. The hose 36 is in fluid communication with an inside conduit 66 that is connected to the air distributor 58. A heat sensor 67 is located on the conduit 66 at the inlet 38 to control the temperature of the air in the conduit 66 that is heated by the heating unit 64. The air may reach a temperature of about 100–120° C. and is extremely dry because the air has been dried in a dehumidifier. The air may be as dry as –dp58° F. It is important to use very dry air to enhance the drying or removing of moisture quickly from the material 70. The air flow in the conduit 66 may be significant. For example, the air flow may reach 180 m$^3$/h. A side hose 68 extends from the conduit 66 to a point in the channel 60 that is below the valve 62.

In operation, a chute having a desirable inner diameter is selected. The distance between the bottom end 46 of the chute 18 and the top surface of the plate 42 is set to a desired level to predetermine the height of the volumetric dosage of the material 70 flowing in the chute 18. The speed of the motor 40 is also set to a desirable speed. The above parameters depend upon the conditions of the operation and the material 70 used.

As the plate 42 rotates, the material 70 is deposited as a long string on the plate 42. The material 70 could be in any suitable form such as in pellet or powder form. For example, the particles may be about 1–2 millimeters. Slightly above the plate 42 a stationary scraper or diverter 72 is attached to the lid 23 to divert or direct the material 70 towards the middle of the plate 42. Between an inside diameter of the plate 42 and the outside of the shaft 44 an opening 74 is defined that allows the material 70 to fall through and onto the dust cone 48. The plate 42 is held to the shaft 44 by spokes 75.

An important feature of the present invention is that dust is sucked out through the outlet hose 24 when the material 70 is on the plate 42. Dust and other particles are also sucked out as the material 70 falls onto the cone 48 as illustrated by dust clouds 76. In other words, the material 70 is heavier than some of the contaminates that are air born. The material 70 then falls onto the warm conduit 66 to further increase the temperature of the material 70 by conduction (as best shown in FIG. 2B). The material 70 then falls onto the closed valve 62.

The material 70 accumulates in the container 50 while being preheated by the hot air exiting the conduit 66 at the distributor 58. Sometimes the material has poor conductivity and takes a long time to heat. However, certain materials should not be heated to more than about 70° C., depending upon the material used, to prevent the start of a chemical reaction in the material initiated by a latent catalyst, such as zinc sulfate, that is mixed into the material 70. It is particularly important that the material 70 is warm to help the catalyst later in the process because the material is so dry. Generally, some moisture in the material may promote the desired reaction once the material is in the mold. However, the increased temperature of the material 70 compensates for the lack of moisture.

Because the air flow from the conduit 66 is significant, the upwardly flowing air has a fluidizing effect on the material 70 disposed in the container 50 while the material is being dried. It is important to note that the warm air from the conduit 66 also warms up the plate 42 as the air flows upwardly in the housing 21. The plate 42 may have a temperature of about 50° C. so that the warm air also dries the material 70.

The temperature sensor 55 monitors the temperature of the material 70 and sends signals to the heater 64 when the material 70 is preheated in the container 50. When the material 70 reaches the maximum level sensor 53, the sensor 53 sends a shut off signal to the motor 40 to stop rotating the plate 42 and the flow of the material 70 in the chute 18 is terminated. Of course, the motor 40 may stop before the material 70 reaches the sensor 53 if a predetermined amount of material 70, such as 1 kilogram, has been ordered.

When the container 50 is filled and the temperature of the material 70 is at a desired level as determined by the sensor 55, an open signal is sent to the valve 62 to open the valve 62 and allow the material to flow into a bottom reservoir 78 that has bottom openings 80 defined therein. It is advantageous to position the sensor 55 away from the distributor 58 so that the sensor measures the temperature of the material 70 without being unduly affected by the temperature of the incoming air in the conduit 66. An added feature is that the valve 62 is sloping towards the side of the location of the sensor 55 so that the air is more likely to flow on the right side of the container 50 because there is a shorted distance from the bottom of the container to the top of the material 70 on the right side of the container 50. This further reduces the risk that the sensor 55 is too much affected by the temperature of the incoming air. Additionally, the suction of the outlet hose 24 is also on the right side of the housing 21.

Figure 1C:
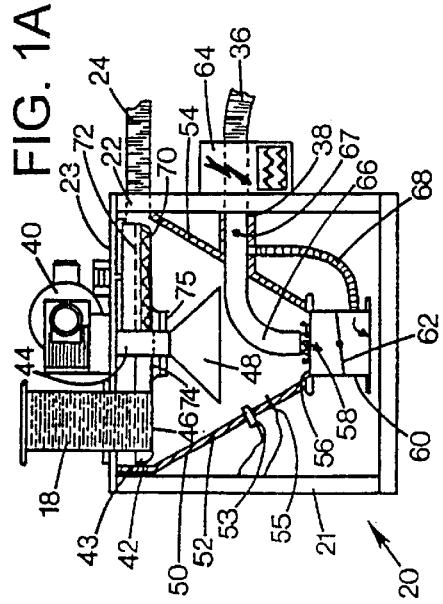
Figure 1D:
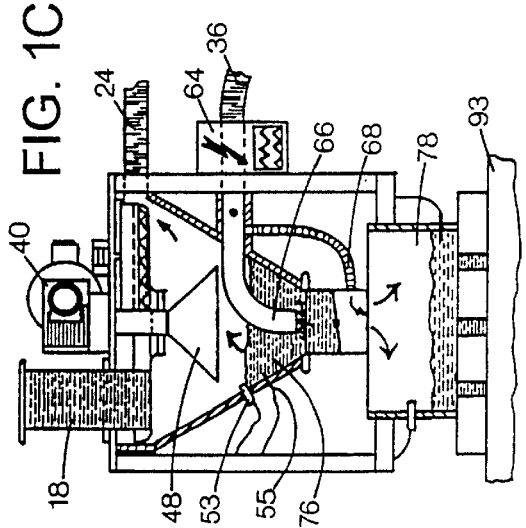

As best seen in FIG. 1C, hot air from the side hose 68 keeps the material 70 warm and dry while being in the reservoir 78. A suitable hot mold 94 is then placed below the openings 80 so that the heated material 70 may flow into the mold. The mold should have a temperature of about 130–170° C. and more preferably 140–150° C. to start the curing reaction of the material 70 depending upon which material 70 is being processed. Preferably, the pressure in the mold should be between about 250–350 bar/cm². The preheater device also has an automatic cleaning feature so that all the dust may be sucked up into a dust cyclone to prevent the dust from entering into the atmosphere.

Figure 2:
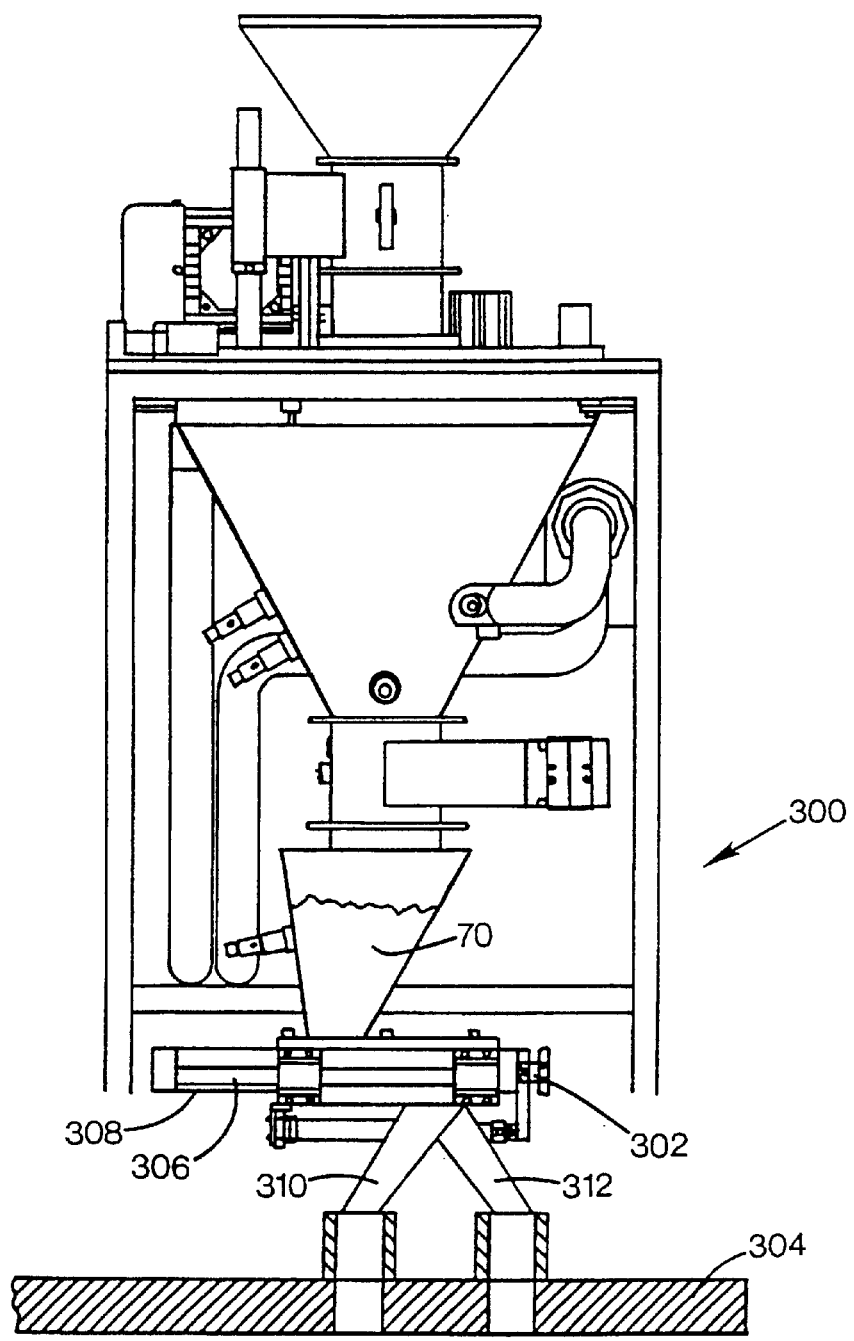
FIG. 2 is a side view of a second embodiment of the preheater of the present invention.

FIG. 2 shows a second embodiment of the preheater device 300 of the present invention. The device 300 is similar to the above described embodiments and only the most important differences are described. The device 300 has an additional dosage mechanism 302 for fine adjustments of the dosage of the material 70 that is deposited into a mold 304. The dosage mechanism 302 may also be used for feeding in the material into the device. The mechanism 302 has horizontal pistons 306 that move back and forth in a horizontal cylinder 308 so that dosages of the material 70 may be distributed in bottom chutes 310, 312 that are disposed above the mold 304. The effective length of the pistons 306 may be adjusted to more precisely the determine the amount of the material 70 that is permitted to enter the chutes 310, 312. One advantage of using the pistons is that the dosage is very accurate and there is less leakage that undesirably may increase the moisture content in the material 70.

FIGS. 3A–3C show detailed cross-sectional side views of a third embodiment of a preheater 320 of the present invention. The preheater 320 has a top feeder section 322 and a middle section 324 and a bottom section 326. The section 322 is conical or triangular shaped and has an openable and closeable valve 328 at a cylindrical bottom section 330 thereof. The valve 328 is closed when the valve is in a horizontal position and opened when the valve is in a vertical position so that a material 332 may flow through the valve 328.

Similarly, the middle section 324 is conical or triangular shaped and has a level sensor 333 mounted at an upper end of the middle section 324 that may close the valve 328 when a sufficient amount of material has flown into the middle section 324. The section 324 has an openable valve 334 at a cylindrical bottom section 336 thereof. The valve 334 may be in a closed position when the valve is in a horizontal position (see FIGS. 3A, 3B,D) and in an opened position when the valve is in a vertical position (see FIG. 3C). A portion 336 of the material 332 may be stored in the middle section 324 and may be released to the bottom section 326 by opening the valve 334 so that the portion 336 is stored in the bottom section 326 (see FIG. 3D).

The bottom portion 326 has a triangular shield 338 that partially or completely covers an opening 340 defined between the middle section 324 and the bottom section 326. A narrow slit opening 341 is formed between the shield 338 and the upper wall 362 to permit the material portion 336 to flow therebetween. The shield 338 is heated by the up-flowing hot and extremely dry air as marked by arrows 342. The shield 338 is also a heat shield and prevents most of the hot dry air from flowing into the middle section 324 to heat up the valve 334. If the valve 334 becomes too warm or hot then the material portion 336 may be adversely affected. The hot air flows out of the downwardly bent conduit 344 that has an open end 346 that terminates at a central bottom area 348 of the bottom section 326. The shield 338 also reduces the risk of the material portion 336 flowing out through an exhaust opening 354. The exhaust opening 354 may also be defined in an openable and closeable lid of the device 300. The hot air flows downwardly and bounces back off a closeable valve 350 at a bottom portion 352 of the bottom section 326. The hot air, as marked by the arrows 342, may flow out through the exhaust opening 354 defined at an upper end 356 of the bottom section 326. A separator 360 may hang down from an upper wall 362 of the bottom section 326 to prevent the exhaust air from interfering with the material that lands on the shield 338.

The valve 350 may be activated to open by a moisture content measurement device 351 located at the exhaust opening 354 that is designed to send signals to open the valve 350 when the exhaust air is sufficiently dry. The valve 350 may also be designed to open based on preset time periods or based on a level sensor 355 disposed at the upper end of the unit 326. It may be possible set up a control system so that if the unit 324 contains material while a different batch is contained in the unit 326, then the valve 334 should not be permitted to open until the valve 350 has been opened and the portion 336 has flown out of the unit 326 so that the unit 326 is ready to receive a new batch of material to be dried.

In operation, the valve 328 is opened so that the portion 336 of the material 332 flows down into the middle section 324 and is held in the section 324 by the closed valve 334. The valve 334 is then open when the level sensor 333 is activated and the portion 336 flows downwardly and lands on the shield 338 that spreads out the portion 336 for improved airing and drying of the material portion 336. The shield 338 also transfers some heat to the portion 336 that lands on the shield 338 to enhance the drying process. Also, before landing on the valve 350 at the bottom of the bottom section 326, pieces 364 are exposed to the upwardly flowing hot and very dry air. Lighter particles, moisture and contaminants flow out through the exhaust opening 354 to improve the purity of the pieces 364 of the portion 336. It is important to remove contaminants and moisture because they may discolor the finished product.

When the entire batch of the portion 336 has landed in the bottom section 326, the valve 350 may be opened to permit the portion 336 be collected for further use. It may be possible to eliminate the unit 324 by providing the unit 322 with a level sensor or any other suitable measuring device such as a hopper feeder or screw feeder for conveying new material into the device 300.

With reference to FIGS. 4A–4F, a preheater and dryer device 400 has a material storage unit or feeding device 402 for storing a material 403 disposed on one side of a longitudinal axis L. The unit 402 has a openable and closeable valve 404 located in a middle segment of the unit 402. A guiding portion or outlet portion 406 protrudes into a triangular shaped drying unit or collector 408. The unit 408 has a central vertical conduit 410 that extends form a top portion 412 to a narrowing bottom portion 414 of the unit 408. The unit 408 has slanting and upwardly diverging inner walls 416. A triangular shaped shield 418 is mounted on the conduit 410 so that bottom corners 420, 422 are adjacent to the walls 416 so that gaps 424, 426 is formed therebetween.

A bottom end 428 of the conduit 410 has a triangular shaped valve 430 mounted thereon so that hot and very dry air may flow inside the conduit 410 and flow out at the bottom end 428 and bounce of the valve 430 and travel upwardly, as indicated by the arrows 432, between the gaps 424, 426 and out through an exhaust opening 456 defined at a right side of the upper end 412 of the unit 408.

The conduit 410 is connected, at its upper end, to a spring-biased and pneumatic adjustment cylinder mechanism 436. The mechanism 436 is biasing the conduit 410 upwardly by springs 437 so that a slanting side wall 457 of the valve 430 bears against acute angled corners 440, 442 at the bottom of the side wall 414. The conduit 410 is hollow so that hot and very dry air may flow inside the conduit 410 as shown by the arrows 411. Before the air enters the conduit 410, the air may be preheated.

Below the valve 430 is a storage unit 444 with an inwardly sloping bottom surface 446 leading to a portion arrangement 448. The arrangement 448 has a handle 450 for opening and closing the arrangement 448 as desired. It should be understood that the device 400 may be modified to include the dosage mechanism 302 so that the mechanism 302 may be used for feeding in the material into the device 400 and/or feeding out the dried and pure material at the bottom of the device 400.

In operation, when the valve 404 is opened, the material 403 falls downwardly through the guide 406 and onto the sidewall 416 and the upper outer wall 452 of the shield 418. The shield is heated by the upwardly flowing hot air. The material 403 is guided through the opening 424 disposed between the corner 420 of the shield 418 and the sidewall 416.

When the material 403 passes through the opening 424 the upwardly flowing air distributes the material 403 into pieces 454 that gather on the upside slanting wall 457 of the valve 430. The material cannot pass into the unit 444 because the valve 430 is closed. The material continues to gather at the bottom 414 of the unit 408 until the storage 402 is empty. Hot air continuously flows upwardly through the material and exhaust gases flow out through the exhaust opening 456 to fluidize the material until the material is sufficiently dry. Dust and contaminants also flow out through the exhaust opening 456. The exhaust opening 456 may also be defined in an openable and closeable lid of the preheater device 400. Similarly to the device in FIG. 3, the, dryness of the material may be measured indirectly by measuring the moisture of the exhaust gases at the opening 456. It should be noted that while the material is fluidized at the bottom of the conical section 408, the unit 402 may be filled with a new batch of material.

When the material contained in the unit 408 is sufficiently dry, the conduit 410 and consequently the valve 430 may be urged downwardly against the biasing force of the springs 437 so that the material may flow from the unit 408 through gaps 458 formed between the valve 430 and the corners 440, 442. The material is further distributed by the wall 457 of the conical shaped valve 430. As best shown in FIG. 4D, when the valve 430 is open, the shield 418 is urged against the sidewall to prevent too much hot air from escaping through the exhaust opening. Since hot and dry air continuously flow out through the bottom end of the conduit 410, the temperature increases in a closed space 460 defined between the walls 416 and the underside of the shield 418. This further dries the material before the material flows into the unit 444. Some air may escape between a gap 462 formed between the shield 418 and the inner wall 416. The temperature should not be too high so that the material melts or reacts in a undesirable way.

When the material to be dried and preheated has a very low density then it may be advantageous to modify the unit 408 from being conical to cylindrical so that the inner walls are vertical. For example, pulverized wood is more suitable dried in a cylindrical middle section unit.

Since the valve 430 is spring biased, the valve 430 may function as a safety valve during a dust or any other explosion inside the housing if the explosion force is greater than the biasing force of the springs 437.

While the present invention has been described in accordance with preferred compositions and embodiments, it is to be understood that certain substitutions and alterations may be made thereto without departing from the spirit and scope of the following claims.

I claim:

1. A preheater and dryer device, comprising:
   a housing having an upper end and a lower end;
   a first collector disposed inside the housing, the first collector having a chamber and a bottom opening defined therein and an inner wall;
   a feeding device attached to the upper end of the housing and extending into the housing, the feeding device containing a material to be preheated, the feeding device having an openable valve;
   a movable central conduit extending from the upper end of the housing to a bottom portion of the first collector, the central conduit being hollow for permitting a hot and dry air to pass therethrough and into the housing;

a first conical shield attached to the central conduit, the conical shield being disposed below the feeding device, the first conical shield having bottom corners adjacent to the inner wall of the first collector;

a second conical shield attached to a bottom end of the central conduit below the first conical shield; and the central conduit being movable between a first open position and a second closed position, the second conical shield being tightly held against the first collector to close the bottom opening thereof when the central conduit is in the second closed position and the second conical shield being separated from the first collector when the central conduit is in the first open position to permit the material to flow through the bottom opening.

2. The preheater and dryer device according to claim 1 wherein, the housing has a second collector disposed below the bottom opening of the first collector.

3. The preheater and dryer device according to claim 2 wherein, the second conical shield extends through the bottom opening and into the second collector.

4. The preheater and dryer device according to claim 1 wherein, first collector is conical shaped and the inner wall is disposed below an outlet of the feeding device.

5. The preheater and dryer device according to claim 1 wherein, the central conduit is in operative engagement with a spring mechanism that biases the central conduit into the second closed position.

6. The preheater and dryer device according to claim 1 wherein, the central conduit has an opening defined immediately above the second conical shield so that the hot dry air is permitted to flow into the first collector.

7. The preheater and dryer device according to claim 1 wherein, housing has an exhaust opening defined therein that is remote from the feeding device.

8. The preheater and dryer device according to claim 1 wherein, the second conical shield has a bottom end that is wider than the bottom opening of the first collector.

9. The preheater and dryer device according to claim 1 wherein, the first conical shield has a width that is substantially similar to a width of the first collector.

10. The preheater and dryer device according to claim 1 wherein, the feeding device is eccentrically disposed on the housing and adjacent to the central conduit.

* * * * *